H. F. LOEWER.
HEEL TRIMMER FOR LASTS.
APPLICATION FILED AUG. 12, 1907.

916,569.

Patented Mar. 30, 1909.
3 SHEETS—SHEET 1.

WITNESSES:

INVENTOR:

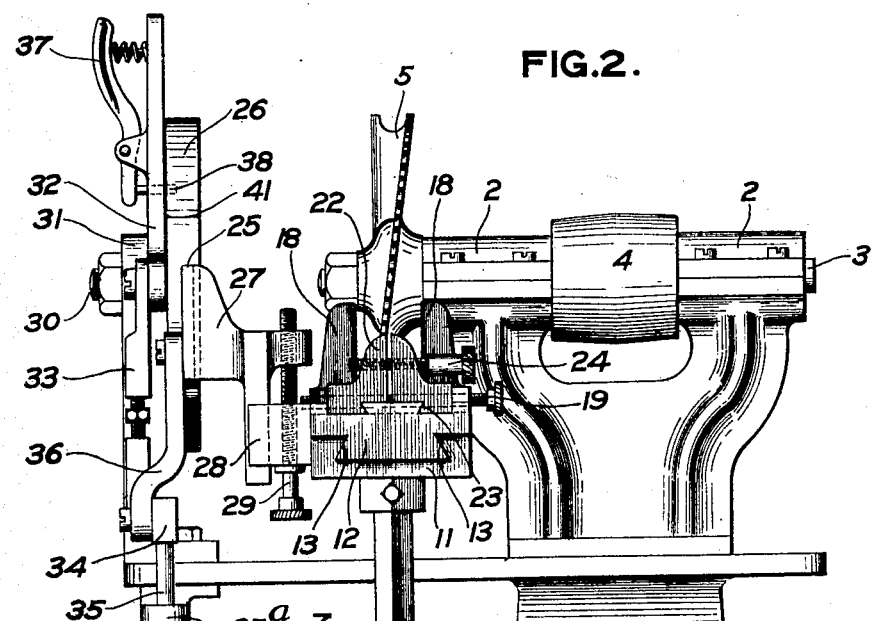

H. F. LOEWER.
HEEL TRIMMER FOR LASTS.
APPLICATION FILED AUG. 12, 1907.

916,569.

Patented Mar. 30, 1909.

WITNESSES:

INVENTOR:

UNITED STATES PATENT OFFICE.

HENRY F. LOEWER, OF ROCHESTER, NEW YORK.

HEEL-TRIMMER FOR LASTS.

No. 916,569.  Specification of Letters Patent.  Patented March 30, 1909.

Application filed August 12, 1907. Serial No. 388,181.

*To all whom it may concern:*

Be it known that I, HENRY F. LOEWER, a citizen of the United States, and resident of Rochester, in the county of Monroe and State of New York, have invented certain new and useful Improvements in Heel-Trimmers for Lasts, of which the following is a specification.

This invention relates to heel trimmers for lasts, and consists in the mechanisms herein described and claimed.

The object of the invention is set forth below.

Figure 1:
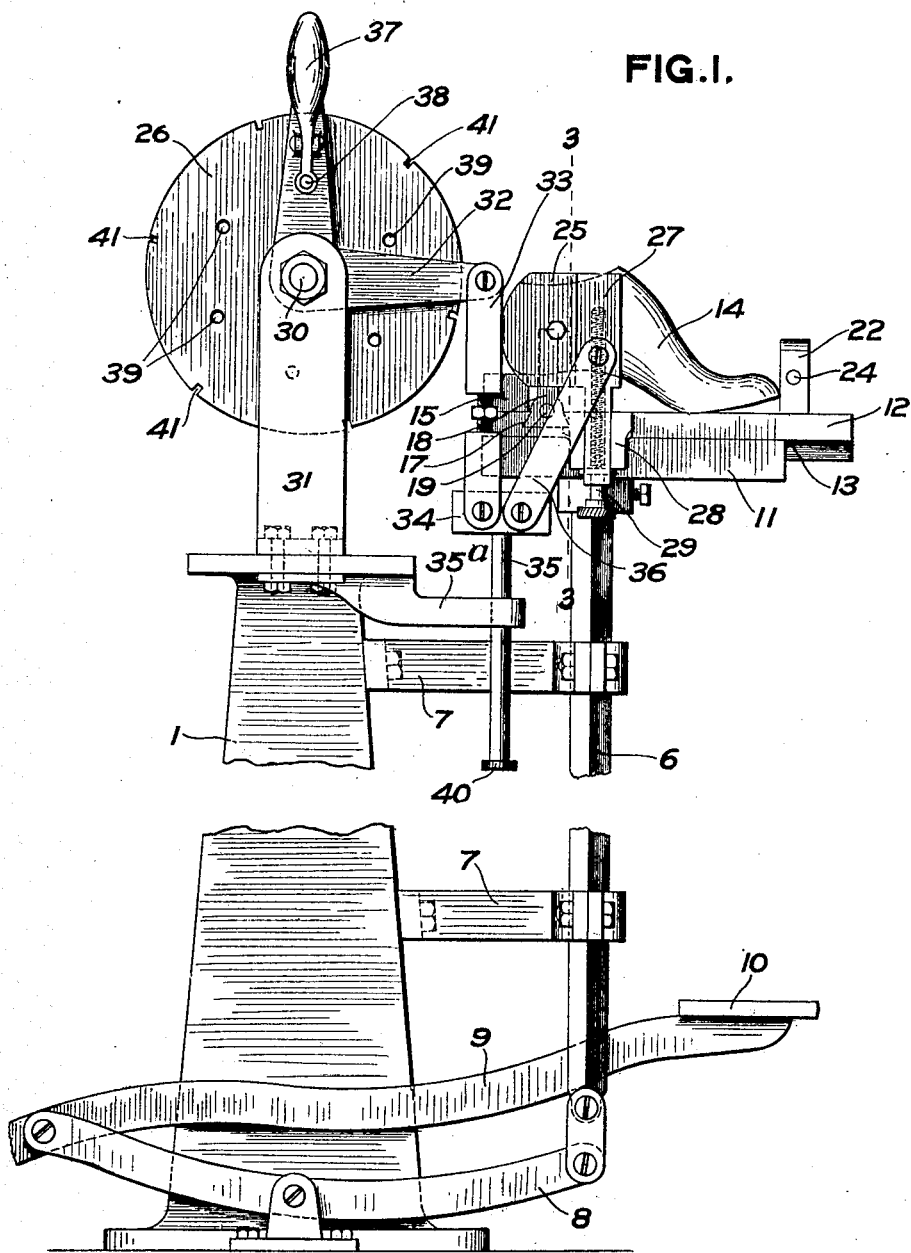
Figures 5, 6:
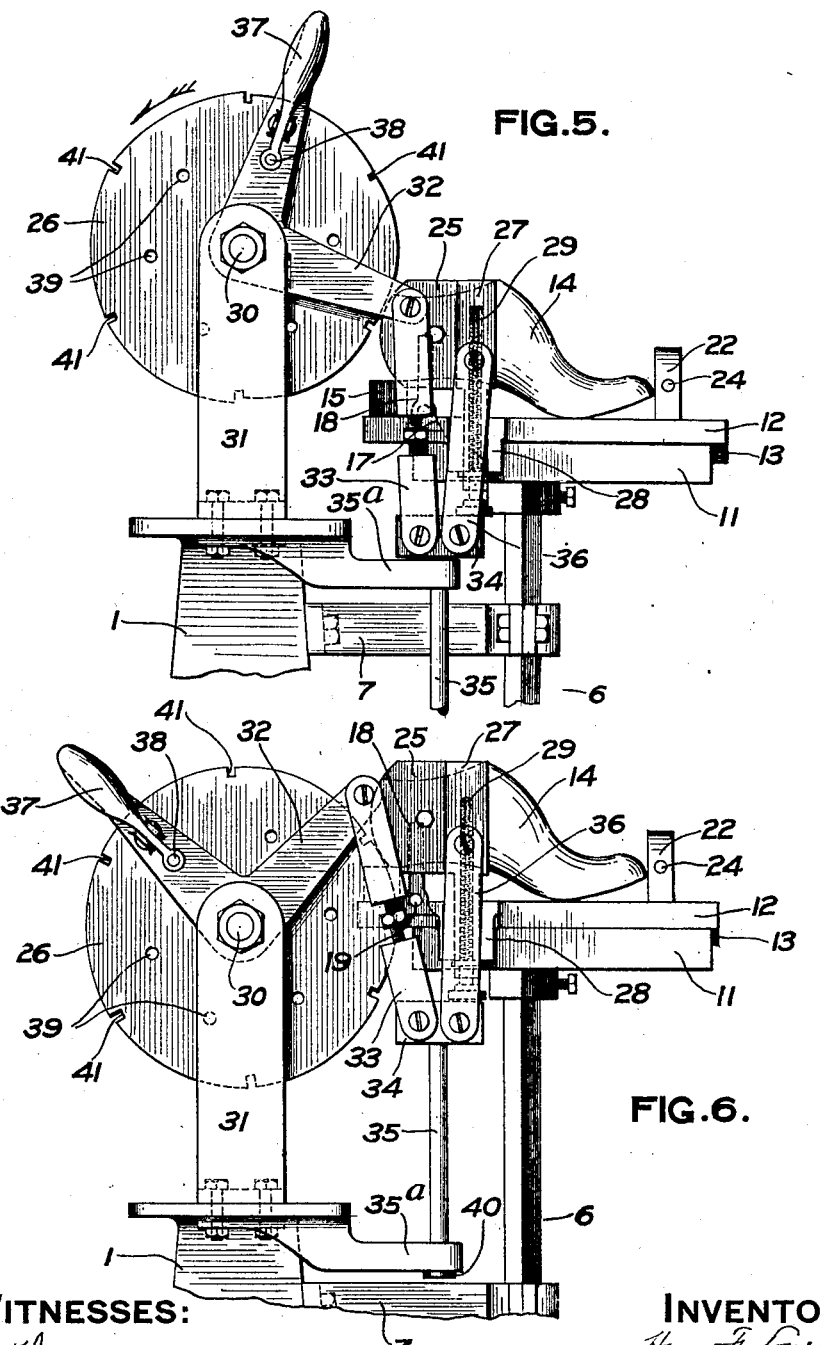

In the drawings:—Figure 1 is an end elevation; Fig. 2 is a front elevation; Fig. 3 is a section on the line 3—3 of Fig. 1; Fig. 4 is a section on the line 4—4 of Fig. 3; Fig. 5 is a partial end elevation with the movable parts in one position; and Fig. 6 is a similar view, the movable parts being in a different position.

The base 1 has fixed to its top a pair of bearings 2, 2, which revolubly support a shaft 3 (Fig. 2). A pulley 4 is adapted to receive a driving belt, and thereby to rapidly rotate a circular saw 5 carried by the said shaft 3 on its inner end. The saw 5 is of the "wabble" type, for reasons hereinafter noted, but other suitable rotary cutters may be employed. In line with the central plane of the saw-blade is a bar 6, supported in guides or brackets 7, and adapted to be moved up and down therein by means of toggle levers 8 and 9, (Fig. 1). The latter has a foot treadle 10 upon its front end whereby said lever may be operated to carry the bar 6 upward, and the weight of the parts is sufficient to return said levers when the foot pressure is removed. This mechanism is for moving a chuck for the last in substantially a tangent to the rotary cutter.

Fixed to the upper end of the bar 6 is a base 11. The chuck 12 for the last is set in dove-tailed guides 13 in the base (Figs. 2 and 3), and may be moved backward and forward, either while said base is at rest, or while it is moving upward or downward. This movement is substantially toward or away from the axis of the saw; thus the chuck may have two movements in directions substantially at right angles to each other. The last 14 may thus be brought into contact with the saw 5 for the purpose of trimming the heel-portion.

Adjustable chucking means are provided for holding the last 14 in place upon the carriage 12. The sole portion of the last rests upon the top of said carriage (Fig. 1), and the bottom of the heel portion rests upon a block 15 (Fig. 4), which is adjustable vertically by means of guide-screws 16.

Directly in front of the block 15 is an undercut-transverse channel 17 (Fig. 4), in which are clamps 18. Said clamps are movable toward and away from each other by means of a right-and-left screw 19, which passes through both of them, and they are so located as to grasp the ankle portion of a last. The screw is held against longitudinal movement by a pair of collars 20, between which is a fork 21 fixed to the carriage 12.

A stop 22 rests in grooves 23 in the carriage 12 (Fig. 2), and may be moved forward or backward, and clamped in place by a thumb screw 24. The toe of the last is placed against this stop when set upon the carriage and the clamps 18 tightened up. Graduations (not shown) may be cut in the upper face of the carriage to serve as a guide in setting said stop to the correct position for any size of last. The heel of the last projects beyond the adjustable block 15.

The mechanism for determining the shape of the heel when cut by the saw comprises a form 25 movable with the chuck (which specifically is an adjustable pattern-plate), and a guide wheel 26 revoluble on substantially the same mathematical axis as the rotary cutter, and which has a surface drawn on the same radius as the cutter. The form or pattern-plate 25, which has the exact shape to which the last is to be trimmed, is bolted to a block 27 (Figs. 1 and 2). Said block is guided in a lug 28 on the carriage 12, and is movable vertically by means of a screw-threaded spindle 29.

The guide-wheel 26 is pivoted at 30 in a bracket 31, and is concentric with the shaft 3. A bell-crank lever 32 is hung upon the same pivot with said wheel, and a link 33 hangs from its outer or front end. The lower end of said link is pivoted to a T-head 34 on the upper end of a vertically-guided rod 35. Another link 36 connects the T-head 34 and the block 27 to which the form or pattern-plate 25 is bolted. In order that the guide-wheel 26 may oscillate with the bell-crank lever 32, the latter has upon its upper arm a spring-latch 37 in which is a pin 38 that is adapted to enter one of a series of holes 39 in said wheel.

The machine is used and operated as follows:—The operator places a last, which is completely shaped with the exception of the back of the heel portion, upon the carriage 12, with the toe against the stop 22, and the lower part of the heel resting upon the block 15. The clamps 18 are then closed upon the last by turning the screw 19, holding it solidly in position. The unfinished heel-portion (not shown) of course projects beyond the face of the pattern-plate 25. The operator then presses downward and inward upon the carriage 12, and said carriage slides in the base 11 until the form or pattern-plate 25 touches the guide-wheel 26 (Fig. 5). The saw 5, which is continuously revolving, cuts off all the heel-part of the last aforesaid, which projects into its path of rotation as determined by the contact of the form or pattern-plate 25 with the periphery of the guide-wheel 26. The operator continues to press the carriage 12 inwardly with his hands, thus holding the form or pattern-plate 25 in contact with the guide-wheel 26, and at the same time he presses downwardly with one foot upon the treadle 10. This latter movement, through the levers 8 and 9, carries the bar 6 and the attached parts upward. The guide-wheel 26 is also oscillated in the direction indicated by the arrow, by reason of its connection with the carriage 12 through the links 33 and 36, and the bell-crank lever 32. As the carriage 12 continues its upward movement, the guide-wheel 26 rotates further, and the form or pattern-plate 25 rolls on its periphery until the parts are in the position shown in Fig. 6. At this point the saw 5 has trimmed off the remaining portion of the last which projects beyond the edge of said form or pattern-plate. A collar 40 on the lower end of the rod 35, by striking the underside of the bracket 35ª, prevents further upward movement of the carriage 12. When the operator removes his foot from the treadle 10, the carriage 12, base 11, and the other movable parts are returned by their own weight to the normal position (Fig. 5).

In order to trim lasts of some different shapes and sizes without changing the form or pattern-plate, the guide-wheel 26 may be divided into equal sections by a series of notches 41 in its periphery, and said periphery may be of a different radius in each section. Any desired one of these surfaces may be brought into the path of the form or pattern-plate 25 by pressing the latch 37 and releasing the pin 38, and then turning the guide-wheel 26 by hand. If a section having a comparatively short radius is so placed that the form or pattern-plate 25 will travel over it, the carriage 12 will be prevented from moving inwardly at the crown of the curve as it would if said curve were longer. The last-heel will therefore be trimmed by the saw to a shape slightly different from the edge of the form or pattern-plate, viz: A last-heel cut on the section of the guide-wheel which has a short radius will have a curve with a shorter radius than the form or pattern-plate; conversely, a last-heel cut on a section of the guide-wheel which has a long radius will have a curve with a longer radius than the pattern-plate.

With this machine an unskilled workman can trim last-heels rapidly and accurately, effecting a large saving in cost. The use of the machine also insures the exact duplication of any number of lasts which may be trimmed at any setting of the machine.

What I claim is:—

1. In a heel trimming machine for lasts, the combination of a rotary cutter, a pattern disk having a bearing portion substantially of the same curvature as the periphery of the cutter, a pattern plate having a curved edge corresponding substantially to the vertical curvature of the heel of the last, a carrier movable with the pattern plate and in a line substantially tangent to the periphery of the cutter, a connection between the pattern disk and the carrier for moving said disk along the edge of the pattern plate as the carrier moves, and a last carriage on the carrier movable to and from the cutter.

2. In a heel trimming machine for lasts, the combination of a rotary cutter, a pattern disk having a bearing portion substantially of the same curvature as the periphery of the cutter, a pattern plate having a curved edge corresponding substantially to the vertical curvature of the heel of the last, a carrier movable with the pattern plate and in a line substantially tangent to the periphery of the cutter, an adjustable connection between the pattern disk and the carrier for moving said disk along the edge of the pattern plate as the carrier moves and the relative positions of the disk and plate may be adjusted, and a last carriage on the carrier movable to and from the cutter.

3. In a heel trimming machine for lasts, the combination of a rotary cutter, a pattern disk having a bearing portion substantially of the same curvature as the periphery of the cutter, a pattern plate having a curved edge corresponding substantially to the vertical curvature of the heel of the last, a carrier movable with the pattern plate and in a line substantially tangent to the periphery of the cutter, two links connected together at one end and at the other ends connected one to the carrier and one to the pattern disk, means for adjusting one or both connections of one of said links, and a last carriage on the carrier movable to and from the cutter.

4. In a heel trimming machine for lasts, the combination of a rotary cutter, a pattern disk having a bearing portion substantially of the same curvature as the periphery of the cutter, a pattern plate having a curved edge corresponding substantially to the vertical curvature of the heel of the last, a carrier movable with the pattern plate and in a line substantially tangent to the periphery of the cutter, two links connected together at one end and at the other ends connected one to the carrier and one to the pattern disk, means for attaching the last mentioned link to different parts of the disk, and a last carriage on the carrier movable to and from the cutter.

5. In a heel trimming machine for lasts, the combination of a rotary cutter, a rotatable pattern disk of substantially the same radius as the cutter and having a series of bearing portions on its edge of different curvatures, a pattern plate having a curved edge corresponding substantially to the vertical curvature of the heel of the last, a carrier movable with the pattern plate and in a line substantially tangent to the periphery of the cutter, means for adjusting the pattern plate along the line of its movement, an adjustable connection between the pattern disk and the carrier for moving the pattern disk along the edge of the pattern plate as the carrier moves in its line and the relative positions of the disk and pattern plate may be adjusted, means for attaching the said connection to different parts of the pattern disk, and a last carriage on the carrier movable to and from the cutter.

6. In a heel trimming machine for lasts, the combination of a rotary cutter, a rotatable pattern disk of substantially the same radius as the cutter and having a series of bearing portions on its edge of different curvatures, a pattern plate having a curved edge corresponding substantially to the vertical curvature of the heel of the last, a carrier movable with the pattern plate and in a line substantially tangent to the periphery of the cutter, a connection between the pattern disk and the carrier for moving the pattern disk along the edge of the pattern plate as the carrier moves in its line, and a last carriage movable on the carrier to and from the cutter and having clamps for holding the last.

7. In a heel trimming machine for lasts, the combination of a rotary cutter, a rotatable pattern disk of substantially the same radius as the cutter and having a series of bearing portions on its edge of different curvatures, a pattern plate having a curved edge corresponding substantially to the vertical curvature of the heel of the last, a carrier movable with the pattern plate and in a line substantially tangent to the periphery of the cutter, a connection between the pattern disk and the carrier for moving the pattern disk along the edge of the pattern plate as the carrier moves in its line, a last carriage movable on the carrier to and from the cutter and having clamps for holding the last, and a longitudinally adjustable toe-gage on the carrier.

8. In a heel trimming machine for lasts, the combination of a rotary cutter, a rotatable pattern disk of substantially the same radius as the cutter and having a series of bearing portions on its edge of different curvatures, a pattern plate having a curved edge corresponding substantially to the vertical curvature of the heel of the last, a carrier movable with the pattern plate and in a line substantially tangent to the periphery of the cutter, a connection between the pattern disk and the carrier for moving the pattern disk along the edge of the pattern plate as the carrier moves in its line, a last carriage movable on the carrier to and from the cutter and having clamps for holding the last, and a vertically adjustable heel-support for the last.

HENRY F. LOEWER.

Witnesses:
D. GURNEE,
H. L. OSGOOD.